(12) United States Patent
Zhu et al.

(10) Patent No.: US 9,914,805 B2
(45) Date of Patent: Mar. 13, 2018

(54) DEVICE FOR SYNTHESIZING A POLYMER WITH REDUCED FORMATION OF DEPOSITS IN THE REACTION CHAMBER

(71) Applicant: BASF SE, Ludwigshafen (DE)

(72) Inventors: Ning Zhu, Mannheim (DE); Achim Stammer, Freinsheim (DE); Joachim Clauss, Darmstadt (DE); Uwe Witt, Mutterstadt (DE); Gad Kory, Gaiberg (DE); Silke Biedasek, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/897,020

(22) PCT Filed: Jun. 11, 2014

(86) PCT No.: PCT/EP2014/062119
§ 371 (c)(1),
(2) Date: Dec. 9, 2015

(87) PCT Pub. No.: WO2014/198766
PCT Pub. Date: Dec. 18, 2014

(65) Prior Publication Data
US 2016/0130398 A1    May 12, 2016

(30) Foreign Application Priority Data
Jun. 12, 2013   (EP) ..................................... 13171657

(51) Int. Cl.
| C08G 69/26 | (2006.01) |
| C08G 69/46 | (2006.01) |
| B01J 19/00 | (2006.01) |
| B01J 19/20 | (2006.01) |
| B01J 4/00 | (2006.01) |
| C08F 2/00 | (2006.01) |
| C08G 69/28 | (2006.01) |
| C08L 77/06 | (2006.01) |
| C08G 69/04 | (2006.01) |

(52) U.S. Cl.
CPC .............. *C08G 69/46* (2013.01); *B01J 4/001* (2013.01); *B01J 19/0026* (2013.01); *B01J 19/0066* (2013.01); *B01J 19/20* (2013.01); *C08F 2/002* (2013.01); *C08F 2/005* (2013.01); *C08G 69/04* (2013.01); *C08G 69/265* (2013.01); *C08G 69/28* (2013.01); *C08L 77/06* (2013.01); *B01J 2219/00168* (2013.01); *B01J 2219/00247* (2013.01)

(58) Field of Classification Search
CPC .... C08G 63/785; C08G 69/04; C08G 69/265; C08G 69/28; C08L 77/06; B29K 2105/0067; C08J 2377/06
See application file for complete search history.

(56) References Cited

U.S. PATENT DOCUMENTS

| 2,838,107 | A |   | 6/1958 | Bridges et al. |
| 2,993,842 | A |   | 7/1961 | Smith |
| 3,545,938 | A |   | 12/1970 | Perry |
| 3,834,441 | A |   | 9/1974 | Vernaleken et al. |
| 3,844,721 | A |   | 10/1974 | Cariou et al. |
| 3,993,462 | A | * | 11/1976 | Jones ..................... C08G 69/04 96/209 |
| 4,110,316 | A |   | 8/1978 | Edging et al. |
| 5,362,448 | A | * | 11/1994 | Kawakami ............... B01J 19/18 422/134 |
| 2002/0128427 | A1 |   | 9/2002 | Schaaf et al. |
| 2014/0148561 | A1 |   | 5/2014 | Paul et al. |

FOREIGN PATENT DOCUMENTS

| EP | 0 267 025 A1 | 5/1988 |
| EP | 2 471 594 A1 | 7/2012 |

OTHER PUBLICATIONS

Alewelt, W., et al., "Industrial Thermoplastics: Polyamide," *Plastics Handbook*, 3/4, Carl Hanser Publishing Company, 1998, Munich, pp. 42-71.
International Search Report for International Patent Application No. PCT/EP2014/062119, dated Aug. 21, 2014.

* cited by examiner

*Primary Examiner* — Gregory Listvoyb
(74) *Attorney, Agent, or Firm* — Marshall, Gerstein & Borun LLP

(57) ABSTRACT

The invention relates to a device for synthesizing a polymer accompanied by separating a gaseous substance. Said device comprises: a reactor chamber (1) having a substantially circular cylinder-shaped upper section (11), which is delimited by two circular surfaces (111, 112) and a circumferential surface (113) and has a longitudinal cylinder axis, and a lower section (12), the upper section (11) and the lower section (12) being connected to one another via the first circular surface (111); an inlet opening (2); a first outlet opening (3), which is arranged in a wall of the lower section (12); a second outlet opening (4), which is arranged in the second circular surface (112) or in the circumferential surface (113) between the inlet opening (2) and the second circular surface (112); and a removal device (51), which is arranged so as to be movable along the longitudinal cylinder axis at least between the second circular surface (112) and the inlet opening (2), and contacts the circumferential surface (113). The invention further relates to a method comprising: feeding an oligomer melt (7) into a circular cylinder-shaped first section (11) of a reaction chamber (1) through an inlet opening (2) tangentially to a circumferential surface (113) of the first section (11); polymerizing the oligomer melt (7) to form a polymer melt (8); removing the polymer melt (8) from the reaction chamber (1) through a first outlet opening (3) of the reaction chamber (1); and removing a gaseous substance (9) from the reaction chamber (1) through a second outlet opening (4) of the reaction chamber (1) above the inlet opening (2). Deposits on at least one inner wall of the first section (11) of the reaction chamber (1) above the inlet opening (2) are removed by a removal device (51).

9 Claims, 2 Drawing Sheets

DEVICE FOR SYNTHESIZING A POLYMER WITH REDUCED FORMATION OF DEPOSITS IN THE REACTION CHAMBER

CROSS-REFERENCE TO RELATED APPLICATION

This is the U.S. national phase of International Application No. PCT/EP2014/062119, filed Jun. 11, 2014, which claims the benefit of European Patent application No. 13171657.3, filed Jun. 12, 2013.

BACKGROUND OF THE INVENTION

The present invention relates to an apparatus for synthesis of a polymer, especially of a polyamide, with separation of a gaseous substance, especially of steam. The present invention further relates to a process for synthesizing a polymer, especially a polyamide, with separation of a gaseous substance, especially of steam, which can especially be performed using the inventive apparatus.

STATE OF THE ART

A multitude of industrial polymers are prepared by a polycondensation in which the increase in molecular weight is accompanied by the release of a low molecular weight component, which generally has to be at least partly removed from the reaction mixture, for example in order to attain the desired molecular weight and/or the desired product properties.

An important class of polycondensation polymers is that of the polyamides. As well as the main fields of use in films, fibers and materials, they serve for a multitude of further end uses. Among the polyamides, polyamide-6 (polycaprolactam) and polyamide-6,6 (Nylon, polyhexamethyleneadipamide) are the polymers prepared in the largest volumes. Polyamide-6,6 is prepared predominantly by polycondensation of what are called AH salt solutions, i.e. of aqueous solutions comprising adipic acid and 1,6-diaminohexane (hexamethylenediamine) in stoichiometric amounts. The conventional process for preparing polyamide-6 is the hydrolytic ring-opening polymerization of ε-caprolactam, which is still of very great industrial significance. Conventional preparation processes for polyamide-6 and polyamide-6,6 are described, for example, in Kunststoffhandbuch, 3/4 Technische Thermoplaste: Polyamide [Plastics Handbook, 3/4 Industrial Thermoplastics: polyamides], Carl Hanser Verlag, 1998, Munich, p. 42-71.

A specific class of industrial polymers which have found wide use is that of semicrystalline or amorphous thermoplastic semiaromatic polyamides, which are notable especially for their high thermal stability and are therefore also referred to as high-temperature polyamides (HTPAs).

Specifically in the synthesis of high-temperature polyamides, it is necessary to remove water from the reaction melt. Thus, the preparation of these HTPAs generally begins with the formation of an aqueous salt solution from at least one diamine and at least one dicarboxylic acid, and optionally further monomer components, such as lactams, ω-amino acids, monoamines, monocarboxylic acids and mixtures thereof, with the proviso that at least one of the components has an aromatic group. The formation of the salt solution is then followed by an oligomerization in the liquid phase, during which there is generally still no removal of water. At the end of this oligomerization, the oligomers have an average, for example, of 4 to 10 repeat units at a conversion of about 70 to 80%. To increase the molecular weight further, two alternative routes are then available. In the first variant, the oligomer formed is converted by dewatering to the solid phase and subjected to what is called a solid state polymerization (SSP). In the second variant, water is removed in a controlled manner and the temperature is increased to convert the aqueous solution to the melt for further polycondensation. There is a particular need for suitable apparatuses and processes for performing this melt condensation.

It is known, for example, that a prepolymer melt comprising water can be reacted in a reactor at a temperature of about 350° C. and a pressure in the range from 10 to 20 bar. In the course of this, however, deposits occur on the inner walls of the reactor above the liquid phase. This leads to a deterioration in product quality.

In the course of synthesis of other polymers too, the removal of gaseous substances from the polymer melt is required. For instance, the U.S. Pat. No. 4,110,316 describes a process for synthesis of polyethylene terephthalate (PET), in which a gaseous mixture of 91.1% ethylene glycol and 8.9% water is deposited from the melt, in order then to recover the ethylene glycol. US 2002/0128427 A1 describes the synthesis of polyesters with a reduced proportion of free acetaldehydes, using acetaldehyde blockers. These react in the polymer melt to form ethylene glycol, which has to be separated out of the melt as a gas together with water, in order to prevent hydrolytic and glycolytic decomposition of the polyester. The performance of these processes too can be hindered by the formation of deposits in the reactor interior.

U.S. Pat. No. 3,834,441 A describes a process for concentrating polymer solutions by evaporation. A polymer solution is heated here under pressure and decompressed through a nozzle into a spiral tube.

U.S. Pat. No. 3,545,938 A describes a vertical cylindrical chemical pressure reactor for production and processing of viscous materials.

U.S. Pat. No. 2,993,842 A describes an apparatus for the distillation of liquids and a process for the fractional distillation of liquids.

SUMMARY OF THE INVENTION

The invention firstly provides an apparatus for synthesis of a polymer with separation of a gaseous substance, comprising a reaction space which is delimited by two circular faces and one shell face and has a longitudinal cylinder axis and comprises a lower section, the upper section and the lower section being joined to one another via the first circular face, an inlet orifice, a first outlet orifice disposed in a wall to the lower section, a second outlet orifice disposed in the second circular face or in the shell face between the inlet orifice and the second circular face, and at least one first removal device which is disposed so as to be movable along the longitudinal cylinder axis between the second circular face and the inlet orifice and is in contact with the shell face.

The invention further provides a process for synthesizing a polymer, comprising the feeding of a prepolymer melt into a circular cylindrical first section of a reaction space through an inlet orifice tangentially to a shell face of the first section, the polymerization of the prepolymer melt to give a polymer melt, the removal of the polymer melt from the reaction space through a first outlet orifice of the reaction space, and the removal of a gaseous substance from the reaction space through a second outlet orifice of the reaction space above the inlet orifice. In the process, deposits on at least one inner wall of the first section of the reaction space above the inlet orifice are removed by at least the first removal device.

A specific embodiment is a process for synthesizing an aliphatic or semiaromatic polyamide, in which a prepolymer of the aliphatic or semiaromatic polyamide is provided and supplied to the apparatus used in accordance with the invention.

DESCRIPTION OF THE INVENTION

A prepolymer in the context of the invention refers to a composition comprising polymeric compounds having complementary functional groups capable of a condensation reaction to increase the molecular weight.

The term "prepolymer melt" in the context of the invention refers to a free-flowing composition of the respective reaction mixture comprising the prepolymers. In the course of this, the temperature of the prepolymer melt need not necessarily be above the melting temperature of the pure prepolymer. The flowability may also result from the presence of other components of the prepolymer melt, for example water, low molecular weight oligomers, etc. In a specific embodiment, the prepolymer itself is present in molten form in the prepolymer melt.

A polymer melt is understood in accordance with the invention to mean a melt which is in chemical equilibrium and may also still comprise oligomers, monomers and water.

The figures for the number-average molecular weight $M_n$ and for the weight-average molecular weight $M_w$ in the context of this invention are each based on a determination by means of gel permeation chromatography (GPC). For calibration, PMMA was used as a polymer standard with low polydispersity.

While the formation of deposits on the inner wall of the reaction space below the inlet orifice in the course of synthesis of a polymer can be prevented by virtue of them being washed away by continuous introduction of a prepolymer melt through the inlet orifice, there is the risk that deposits will form above the inlet orifices. This can be avoided in accordance with the invention by movement of at least the first removal device along the longitudinal cylinder axis. The suitability of the at least first removal device for removing deposits from the inner wall of the reaction space above the inlet orifice is preferably increased in accordance with the invention by virtue of at least the first removal device being rotatable about the longitudinal cylinder axis.

In order to avoid the formation of deposits below the inlet orifice, the apparatus, preferably in accordance with the invention, is configured such that a prepolymer melt introduced through the inlet orifice into the reaction space fully wets the inner wall of the reaction space below the inlet orifice. In one embodiment of the invention, this is achieved by virtue of the inlet orifice being disposed within the shell face such that tangential introduction of a liquid through the inlet orifice along the shell face in the upper section is enabled. The inlet orifice may have either a round or a polygonal cross section, especially a square cross section. In another embodiment of the invention, the inlet orifice is connected by means of an inlet line to the second circular face of the upper section and is disposed so as to enable tangential introduction of a liquid through the inlet orifice along the shell face in the upper section. In order to enable movement of the at least first removal device, at least the first removal device has an orifice through which the inlet line is conducted.

It is additionally preferable that at least the first removal device has orifices in order to enable passage of a gaseous substance through the at least first removal device.

If the second outlet orifice is connected to an outlet line, it is possible that deposits also form in this outlet line in the course of synthesis of a polymer. In order to avoid this, it is preferable in accordance with the invention that at least one second removal device which is disposed so as to be movable along the outlet line and is in contact with the inner face of the outlet line is disposed in the outlet line.

In order to enable the reliable transport of the synthesized polymer out of the reaction space through the first outlet orifice, it is preferable in accordance with the invention that a cross section of the lower section decreases from the upper section toward the first outlet orifice. This increases the speed with which, for example, a polymer melt moves in the reaction space towards the first outlet orifice with falling distance from the first outlet orifice. It is additionally preferable that a transport apparatus which is disposed in the lower section of the reaction space is set up to transport a liquid, especially a polymer melt, from the lower section into the first outlet orifice. This may be, for example, a transport screw.

The invention further provides a process for synthesizing a polymer, comprising
a) feeding a prepolymer melt into a circular cylindrical first section of a reaction space through an inlet orifice tangentially to a shell face of the first section,
b) polymerizing the prepolymer melt to give a polymer melt,
c) removing the polymer melt from the reaction space through a first outlet orifice of the reaction space, and
d) removing a gaseous substance from the reaction space through a second outlet orifice of the reaction space above the inlet orifice,
wherein deposits on at least one inner wall of the upper section of the reaction space above the inlet orifice are removed by at least the first removal device.

The process according to the invention is preferably performed continuously, such that a constant stream of the prepolymer melt, as a result of the tangential introduction, wets the entire inner surface of the reaction space below the inlet orifice and thus prevents formation of deposits. Deposits which form above the inlet orifice in the reaction space are removed by at least the first removal device. In this context, the at least first removal device can be operated continuously or else discontinuously. For removal of the deposits, it is moved along the longitudinal cylinder axis of the first section above the inlet orifice. At the same time, it is preferably also rotated about the longitudinal cylinder axis of the first section.

Because of the elevated viscosity of the polymer melt compared to the prepolymer melt, the former falls to the base of the reaction space and leaves it through the first outlet orifice. This is preferably accelerated in accordance with the invention by virtue of the speed with which the polymer melt moves toward the first outlet orifice rising with falling distance from the first outlet orifice. This is more preferably achieved by virtue of the polymer melt being transported by means of a transport apparatus to the first outlet orifice.

In principle, the process according to the invention can be performed with any polymer which can be converted to a melt. The polymer is preferably selected from thermoplastic polymers. The polymer is more preferably selected from polyamides, thermoplastic polyurethanes, polyolefins, vinylaromatic polymers, polyesters, polyacetals, polycarbonates, polysulfones, polyether sulfones and mixtures thereof.

Preferably, the polymer is a polyamide and the gaseous substance is steam.

A specific embodiment of the process according to the invention is therefore a process for synthesizing an aliphatic or semiaromatic polyamide, in which, in step a), a prepolymer of the aliphatic or semiaromatic polyamide is provided and supplied to the apparatus used in accordance with the invention.

The polyamides are designated in the context of the invention using abbreviations, some of which are customary in the art, which consist of the letters PA followed by numbers and letters. Some of these abbreviations are standardized in DIN EN ISO 1043-1. Polyamides which can be derived from aminocarboxylic acids of the $H_2N$—$(CH_2)_x$—COOH type or the corresponding lactams are identified as PA Z where Z denotes the number of carbon atoms in the monomer. For example, PA 6 represents the polymer of ε-caprolactam or of ω-aminocaproic acid. Polyamides which derive from diamines and dicarboxylic acids of the $H_2N$—$(CH_2)_x$—$NH_2$ and HOOC—$(CH_2)_y$—COOH types are identified as PA Z1Z2 where Z1 denotes the number of carbon atoms in the diamine and Z2 the number of carbon atoms in the dicarboxylic acid. Copolyamides are designated by listing the components in the sequence of their proportions, separated by slashes. For example, PA 66/610 is the copolyamide of hexamethylenediamine, adipic acid and sebacic acid. For the monomers having an aromatic or cycloaliphatic group which are used in accordance with the invention, the following letter abbreviations are used:
T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

Hereinafter, the expression "$C_1$-$C_4$-alkyl" comprises unsubstituted straight-chain and branched $C_1$-$C_4$-alkyl groups. Examples of $C_1$-$C_4$-alkyl groups are especially methyl, ethyl, propyl, isopropyl, n-butyl, isobutyl, sec-butyl, tert-butyl (1,1-dimethylethyl).

In the aromatic dicarboxylic acids, aliphatic dicarboxylic acids, cycloaliphatic dicarboxylic acids and monocarboxylic acids mentioned hereinafter, the carboxyl groups may each be present in underivatized form or in the form of derivatives. In the case of dicarboxylic acids, neither carboxyl group, one carboxyl group or both carboxyl groups may be in the form of a derivative. Suitable derivatives are anhydrides, esters, acid chlorides, nitriles and isocyanates. Preferred derivatives are anhydrides or esters. Anhydrides of dicarboxylic acids may be in monomeric or in polymeric form. Preferred esters are alkyl esters and vinyl esters, more preferably $C_1$-$C_4$-alkyl esters, especially the methyl esters or ethyl esters. Dicarboxylic acids are preferably in the form of mono- or dialkyl esters, more preferably mono- or di-$C_1$-$C_4$-alkyl esters, more preferably monomethyl esters, dimethyl esters, monoethyl esters or diethyl esters. Dicarboxylic acids are additionally preferably in the form of mono- or divinyl esters. Dicarboxylic acids are additionally preferably in the form of mixed esters, more preferably mixed esters with different $C_1$-$C_4$-alkyl components, especially methyl ethyl esters.

The polyamide prepolymer is provided by polycondensation of an aqueous composition comprising at least one component suitable for polyamide formation.

Preferably, the prepolymer (and accordingly the aliphatic or semiaromatic polyamide) comprises incorporated components selected from
A) unsubstituted or substituted aromatic dicarboxylic acids and derivatives of unsubstituted or substituted aromatic dicarboxylic acids,
B) unsubstituted or substituted aromatic diamines,
C) aliphatic or cycloaliphatic dicarboxylic acids and derivatives thereof,
D) aliphatic or cycloaliphatic diamines,
E) monocarboxylic acids and derivatives thereof,
F) monoamines,
G) at least trifunctional amines,
H) lactams,
I) ω-amino acids,
K) compounds which are different than A) to I) and are cocondensable therewith.

A suitable embodiment is aliphatic polyamides. For aliphatic polyamides of the PA Z1 Z2 type (such as PA 66), the proviso applies that at least one of components C) and D) must be present and neither of components A) and B) may be present. For aliphatic polyamides of the PA Z type (such as PA 6 or PA 12), the proviso applies that at least component H) must be present.

A preferred embodiment is semiaromatic polyamides. For semiaromatic polyamides, the proviso applies that at least one of components A) and B) and at least one of components C) and D) must be present.

The aromatic dicarboxylic acids A) are preferably selected from in each case unsubstituted or substituted phthalic acid, terephthalic acid, isophthalic acid, naphthalenedicarboxylic acids or diphenyldicarboxylic acids, and the derivatives and mixtures of the aforementioned aromatic dicarboxylic acids.

Substituted aromatic dicarboxylic acids A) preferably have at least one (e.g. 1, 2, 3 or 4) $C_1$-$C_4$-alkyl radical. More particularly, substituted aromatic dicarboxylic acids A) have 1 or 2 $C_1$-$C_4$-alkyl radicals. These are preferably selected from methyl, ethyl, n-propyl, isopropyl, n-butyl, isobutyl, sec-butyl and tert-butyl, more preferably methyl, ethyl and n-butyl, particularly methyl and ethyl and especially methyl. Substituted aromatic dicarboxylic acids A) may also bear further functional groups which do not disrupt the amidation, for example 5-sulfoisophthalic acid, and salts and derivatives thereof. A preferred example thereof is the sodium salt of dimethyl 5-sulfoisophthalate.

Preferably, the aromatic dicarboxylic acid A) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid.

More preferably, the aromatic dicarboxylic acid A) used is terephthalic acid, isophthalic acid or a mixture of terephthalic acid and isophthalic acid.

Preferably, the semiaromatic polyamide prepolymers provided in accordance with the invention have a proportion of aromatic dicarboxylic acids among all the dicarboxylic acids of at least 50 mol %, more preferably of 70 mol % to 100 mol %. In a specific embodiment, the semiaromatic polyamides prepared by the process according to the invention (and the prepolymers provided in step a)) have a proportion of terephthalic acid or isophthalic acid or a mixture of terephthalic acid and isophthalic acid, based on all the dicarboxylic acids, of at least 50 mol %, preferably of 70 mol % to 100 mol %.

The aromatic diamines B) are preferably selected from bis(4-aminophenyl)methane, 3-methylbenzidine, 2,2-bis (4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane or mixtures thereof.

The aliphatic or cycloaliphatic dicarboxylic acids C) are preferably selected from oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines D) are preferably selected from ethylenediamine, propylenediamine, tetramethylenediamine, heptamethylenediamine, hexamethylenediamine, pentamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane and mixtures thereof.

More preferably, the diamine D) is selected from hexamethylenediamine, 2-methylpentamethylenediamine, octamethylenediamine, nonamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

In a specific implementation, the semiaromatic polyamides comprise at least one copolymerized diamine D) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof.

In a specific implementation, the semiaromatic polyamides comprise exclusively hexamethylenediamine as the copolymerized diamine D).

In a further specific implementation, the semiaromatic polyamides comprise exclusively bis(4-aminocyclohexyl) methane as the copolymerized diamine D).

In a further specific implementation, the semiaromatic polyamides comprise exclusively 3,3'-dimethyl-4,4'-diaminodicyclohexylmethane (MACM) as the copolymerized diamine D).

In a further specific implementation, the semiaromatic polyamides comprise exclusively isophoronediamine (IPDA) as the copolymerized diamine D).

The prepolymers (and correspondingly the aliphatic and the semiaromatic polyamides) may comprise at least one copolymerized monocarboxylic acid E). The monocarboxylic acids E) serve to end-cap the polyamides prepared in accordance with the invention. Suitable monocarboxylic acids are in principle all of those capable of reacting with at least some of the amino groups available under the reaction conditions of the polyamide condensation. Suitable monocarboxylic acids E) are aliphatic monocarboxylic acids, alicyclic monocarboxylic acids and aromatic monocarboxylic acids. These include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, α-naphthalenecarboxylic acid, β-naphthalenecarboxylic acid, phenylacetic acid, oleic acid, ricinoleic acid, linoleic acid, linolenic acid, erucic acid, fatty acids from soya, linseeds, castor oil plants and sunflowers, acrylic acid, methacrylic acid, Versatic® acids, Koch® acids and mixtures thereof.

If the monocarboxylic acids E) used are unsaturated carboxylic acids or derivatives thereof, it may be advisable to work in the presence of commercial polymerization inhibitors.

More preferably, the monocarboxylic acid E) is selected from acetic acid, propionic acid, benzoic acid and mixtures thereof.

In a specific implementation, the prepolymers (and correspondingly the aliphatic and the semiaromatic polyamides) comprise exclusively propionic acid as the copolymerized monocarboxylic acid E).

In a further specific implementation, the prepolymers (and correspondingly the aliphatic and the semiaromatic polyamides) comprise exclusively benzoic acid as the copolymerized monocarboxylic acid E).

In a further specific implementation, the prepolymers (and correspondingly the aliphatic and the semiaromatic polyamides) comprise exclusively acetic acid as the copolymerized monocarboxylic acid E).

The prepolymers (and correspondingly the aliphatic and the semiaromatic polyamides) may comprise at least one copolymerized monoamine F). In this context, the aliphatic polyamides comprise only copolymerized aliphatic monoamines or alicyclic monoamines. The monoamines F) serve to end-cap the polyamides prepared in accordance with the invention. Suitable monoamines are in principle all of those capable of reacting with at least some of the carboxylic acid groups available under the reaction conditions of the polyamide condensation. Suitable monoamines F) are aliphatic monoamines, alicyclic monoamines and aromatic monoamines. These include methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

For preparation of the prepolymers (and correspondingly of the aliphatic and the semiaromatic polyamides), it is additionally possible to use at least one at least trifunctional amine G). These include N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(aminomethyl)-N-[3-(aminomethyl)-3,5,5-trimethylcyclohexyl]-3,5,5-trimethylcyclohexanamine. Preferably, no at least trifunctional amines G) are used.

Suitable lactams H) are ε-caprolactam, 2-piperidone (δ-valerolactam), 2-pyrrolidone (γ-butyrolactam), capryllactam, enantholactam, lauryllactam and mixtures thereof.

Suitable ω-amino acids I) are 6-aminocaproic acid, 7-aminoheptanoic acid, 11-aminoundecanoic acid, 12-aminododecanoic acid and mixtures thereof.

Suitable compounds K) which are different than A) to I) and are cocondensable therewith are at least tribasic carboxylic acids, diaminocarboxylic acids, etc.

Suitable compounds K) are additionally 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethylcyclohexyl)methyl]-C-hydroxycarbonimidoyl]benzoic acid, 3-[(Z)—N-[(5-amino-1,3,3-trimethylcyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

In a preferred embodiment, the process according to the invention serves for preparation of an aliphatic polyamide.

In that case, the polyamide is preferably selected from PA 6, PA 11, PA 12, PA 46, PA 66, PA 666, PA 69, PA 610, PA 612, PA 96, PA 99, PA 910, PA 912, PA 1212, and copolymers and mixtures thereof.

More particularly, the aliphatic polyamide is PA 6, PA 66 or PA 666, most preferably PA 6.

In a further preferred embodiment, the process according to the invention serves for preparation of a semiaromatic polyamide.

In that case, the polyamide is preferably selected from PA 6.T, PA 9.T, PA 8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In that case, the polyamide is more preferably selected from PA 6.T, PA 9.T, PA 10.T, PA 12.T, PA 6.I, PA 9.I, PA 10.I, PA 12.I, PA 6.T/6.I, PA 6.T/6, PA6.T/8.T, PA 6.T/10T, PA 10.T/6.T, PA 6.T/12.T, PA12.T/6.T, PA IPDA.I, PA IPDA.T, PA 6.T/IPDA.T, PA 6.T/6.I/IPDA.T/IPDA.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T
and copolymers and mixtures thereof.

In a specific implementation, the semiaromatic polyamide is PA 6.T/6.I.

In a further specific implementation, the semiaromatic polyamide is PA 6.T/6.I/IPDA.T/IPDA.I.

In a further specific implementation, the semiaromatic polyamide is PA 6.T/6.I/MXDA.T/MXDA.I.

For preparation of the prepolymers provided in accordance with the invention, an aqueous composition comprising at least one component suitable for polyamide formation is generally used. The prepolymers can in principle be prepared by customary processes known to those skilled in the art. A suitable process for preparing semiaromatic polyamide oligomers is described, for example, in EP 0 693 515 A1.

The prepolymers (especially the polyamide prepolymers) provided for use in the process according to the invention preferably have a number-average molecular weight $M_n$ of about 500 to about 12,000 g/mol, preferably of about 1000 to 4000 g/mol.

In principle, the process according to the invention can be performed in any apparatus suitable therefor. Preference is given, however, to performing it in the above-described inventive apparatus.

If the process according to the invention is used to prepare aliphatic polyamides, they preferably have a number-average molecular weight $M_n$ within a range from 13,000 to 28,000 g/mol.

If the process according to the invention is used to prepare semiaromatic polyamides, they preferably have a number-average molecular weight $M_n$ within a range from 13,000 to 25,000 g/mol, more preferably from 15,000 to 20,000 g/mol.

The aliphatic polyamides obtained by the process according to the invention preferably have a weight-average molecular weight $M_w$ within a range from 20,000 to 140,000 g/mol.

The semiaromatic polyamides obtained by the process according to the invention preferably have a weight-average molecular weight $M_w$ within a range from 25,000 to 125,000 g/mol.

The aliphatic and semiaromatic polyamides obtained by the process according to the invention preferably have a polydispersity PD ($=M_w/M_n$) not exceeding 6, more preferably not exceeding 5, especially not exceeding 3.5.

DESCRIPTION OF FIGURES AND EXAMPLES

The invention will now be illustrated by working examples with reference to the figures.

Figure 1:
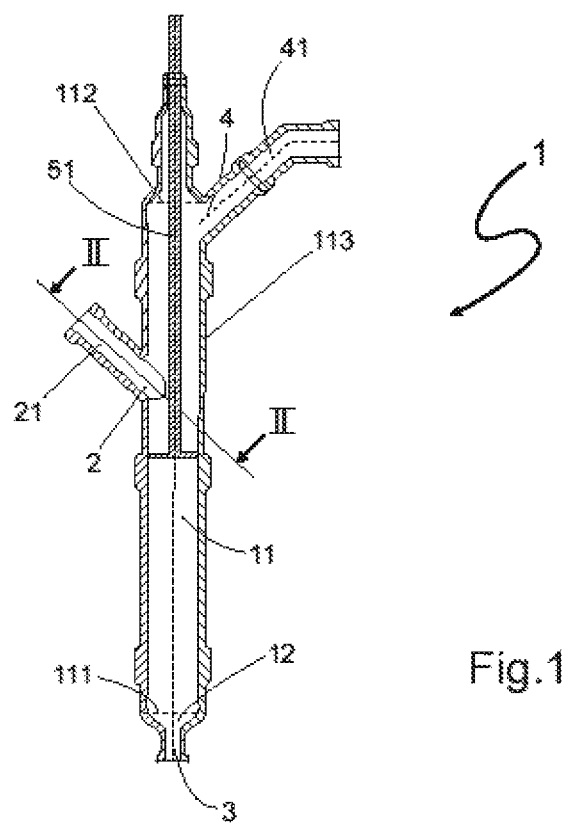
FIG. 1 shows a cross section of an apparatus in one embodiment of the invention.
Figure 2:
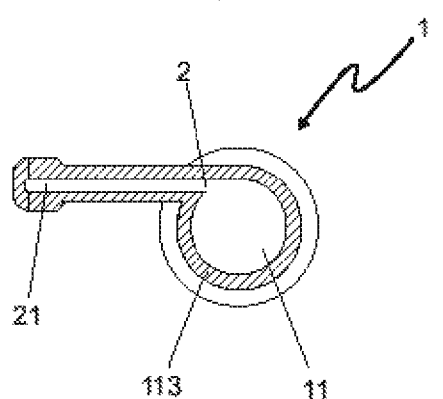
FIG. 2 shows a section of the apparatus according to FIG. 1 along the line II-II.

A first embodiment of the inventive apparatus is shown in FIGS. 1 and 2. A reaction space 1 has an upper section 11 and a lower section 12. The upper section 11 is circular cylindrical and is bounded by two circular faces 111, 112 and one shell face 113. The upper section 11 and the lower section 12 are joined to one another via the first circular face 111. In the shell face 113 of the upper section 11 is disposed an inlet orifice 2 connected by an inlet line 21. The inlet orifice 2 is disposed so as to enable tangential introduction of a liquid through the inlet orifice 2 along the shell face 113 in the upper section 11 of the reaction space 1. The cross section of the lower section 12 shown in FIG. 1 decreases from the upper section 11 downward. The lower section 12 ends in a first outlet orifice 3. A second outlet orifice 4 is disposed above the inlet orifice 2 in the shell face 113 of the upper section 11 and is connected to an outlet line 41. A first removal device 51 is disposed so as to be movable in the upper section 11 of the reaction space 1. It consists of a rod which is conducted through the top of the reaction space 1, the lower end of which ends in a removal head. The removal head is in contact with the inner wall of the upper section 11. The length of the rod is selected such that the removal head can be moved over the entire region above the inlet orifice 2 and over some of the region of the upper section 11 below the inlet orifice 2. In addition, the first removal device 51 is rotatable about the longitudinal cylinder axis.

Figure 3:
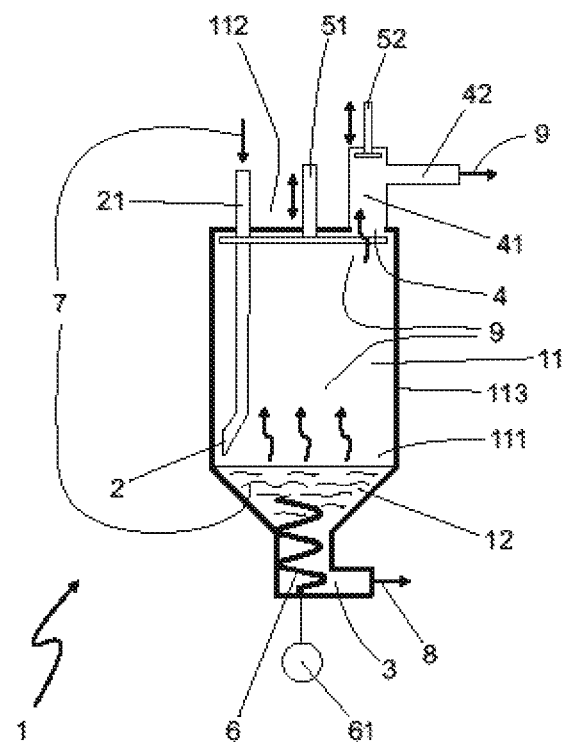
FIG. 3 shows a cross section of an apparatus in another embodiment of the invention.
Figure 4:
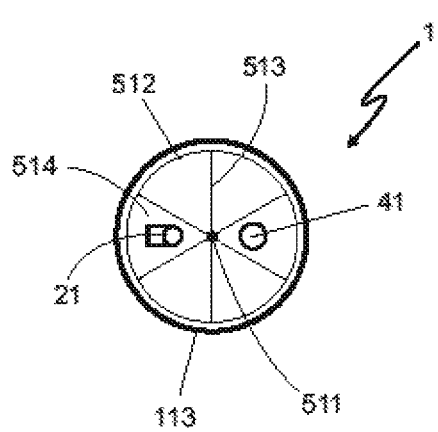
FIG. 4 shows a top view of the apparatus according to FIG. 3, omitting the top of the reaction space thereof.

Another embodiment of the inventive apparatus is shown in FIGS. 3 and 4. The division of the reaction space 1 into a circular cylindrical upper section 11 having two circular faces 111, 112 and one shell face 113 and a lower section 12 corresponds to that in the first embodiment. The inlet orifice 2 is connected by means of an inlet line 21 to the second circular face 112 of the upper section 11 and is arranged such that it enables tangential introduction of a liquid through the inlet orifice 2 along the shell face 113 into the upper section 11. In contrast to the first embodiment, the first outlet orifice 3 is disposed not at the base of the lower section 12 but at the side of this base. For transport of a polymer melt through the first outlet orifice 3, a transport apparatus 6 disposed in the lower section 12 in the form of a transport screw is provided, this being driven by means of a motor 61. The first removal device 51 consists of a bar 511 and an annular blade 512 joined to the bar 511 by six spokes 513. Between the spokes 513 are orifices. The inlet line 21 is conducted through one of these orifices 514. All the orifices enable movement of a gaseous substance 9 through the first removal device 51 to the second outlet orifice 4. The second outlet orifice 4 is connected to an outlet line 41, which in turn is connected to an outlet pipe 42. Along the longitudinal axis of the outlet line 41 is arranged a second movable removal device 52, in order to be able to remove deposits from the inner wall of the outlet line 41. The second removal device 52 is in contact with the inner wall of the outlet line 41.

In one embodiment of the process according to the invention for synthesizing a polymer, which is performed in the inventive apparatus according to FIGS. 3 and 4, a prepolymer melt 7 is introduced through the inlet orifice 2 tangentially to the shell face 113 of the first section 11 into the reaction space 1 of the apparatus. This collects in the lower section 12 of the reaction space. Polymerization of the prepolymer melt 7 takes place to give a polymer melt 8, which is transported out of the first outlet orifice 3 by means of the transport apparatus 6. Steam is transported as a gaseous substance out of the reaction space 1 through the second outlet orifice 4, the outlet line 41 and the outlet pipe 42. Deposits on the inner wall of the first section 11 above the inlet orifice 2 are removed by vertical movement of the first removal device 51 in the reaction space 11. Deposits in the outlet line 41 are removed by movement of the second removal device 52 along all of the outlet line 41.

The inventive apparatus enables the performance of the process according to the invention by avoiding the formation of deposits within the reaction space or the outlet line. This enables continuous performance of the process according to the invention over a long period without any need for interruption for manual cleaning of the apparatus to remove deposits.

LIST OF REFERENCE NUMERALS

1 reaction space
2 inlet orifice
3 first outlet orifice
4 second outlet orifice
6 transport apparatus
7 prepolymer melt
8 polymer melt
9 gaseous substance
11 upper section
12 lower section
21 inlet line
41 outlet line
42 outlet pipe
51 first removal device
52 second removal device
61 motor
111 first circular face
112 second circular face
113 shell face
511 bar
512 blade
513 spoke(s)
514 orifice(s)

The invention claimed is:

1. A continuous process for synthesizing a polymer with separation of a gaseous substance in an apparatus comprising a reaction space (1) comprising an essentially circular cylindrical upper section (11) which is delimited by two circular faces (111, 112) and one shell face (113) and has a longitudinal cylinder axis, and a lower section (12), the upper section (11) and the lower section (12) being joined to one another via the first circular face (111), an inlet orifice (2) is either disposed within the shell face (113) or the inlet orifice (2) is connected by means of an inlet line (21) to the second circular face (112) of the upper section (11), the first removal device (51) having an orifice through which the inlet line (21) is conducted such that in either case tangential introduction of a liquid through the inlet orifice (2) along the shell face (113) into the upper section (11) is enabled, a first outlet orifice (3) disposed in a wall of the lower section (12), a second outlet orifice (4) disposed in the second circular face (112) or in the shell face (113) between the inlet orifice (2) and the second circular face (112), and at least one first removal device (51) disposed so as to be movable along the longitudinal cylinder axis at least between the second circular face (112) and the inlet orifice (2) and is in contact with the shell face (113), having the following process steps:

a) feeding a prepolymer melt (7) into the circular cylindrical upper section (11) of the reaction space (1) through the inlet orifice (2) tangentially to a shell face (113) of the first section (11), b) polymerizing the prepolymer melt (7) to give a polymer melt (8), c) removing the polymer melt (8) from the reaction space (1) through the first outlet orifice (3) of the reaction space (1), and d) removing a gaseous substance (9) from the reaction space (1) through the second outlet orifice (4) of the reaction space (1) above the inlet orifice (2), wherein deposits on at least one inner wall of the upper section (11) of the reaction space (1) above the inlet orifice (2) are removed by at least the first removal device (51), wherein the polymer is a semiaromatic polyamide comprising at least one repeat unit having an aromatic group and at least one repeat unit having an aliphatic or cycloaliphatic group in incorporated form.

2. The process according to claim 1, wherein the first removal device (51) is rotated about the longitudinal cylinder axis of the upper section (11).

3. The process according to claim 1, wherein the second outlet orifice (4) is connected to an outlet line (41) in which there is disposed a second removal device (52) which is disposed so as to be movable along the outlet line (41) and is in contact with the inner face of the outlet line (41).

4. The process according to claim 1, wherein a cross section of the lower section (12) decreases from the upper section (11) toward the first outlet orifice (3).

5. The process according to claim 1, wherein the speed with which the polymer melt (8) moves toward the first outlet orifice (3) rises with falling distance from the first outlet orifice (3).

6. The process according to claim 5, wherein the polymer melt (8) is transported by means of a transport apparatus (6) to the first outlet orifice (3).

7. The process according to claim 1, wherein the polymer comprises a thermoplastic polymer.

8. The process according to claim 1, wherein the gaseous substance is steam.

9. The process according to claim 1, wherein the polymer is a polyamide selected from the group consisting of PA 6.T, PA 9.T, PA8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

* * * * *